Oct. 27, 1931.  J. N. PARKER  1,829,453

EXPANSION COUPLING FOR SCREW CONVEYERS

Filed Oct. 5, 1928

INVENTOR
John N Parker
BY
*L. A. Paley*
ATTORNEY

Patented Oct. 27, 1931

1,829,453

UNITED STATES PATENT OFFICE

JOHN N. PARKER, OF FORT DODGE, IOWA, ASSIGNOR TO UNITED STATES GYPSUM COMPANY, OF CHICAGO, ILLINOIS, A CORPORATION OF ILLINOIS

EXPANSION COUPLING FOR SCREW CONVEYERS

Application filed October 5, 1928. Serial No. 310,470.

This invention relates to expansion couplings for screw flight, paddle, or other types of rotary conveyers. An object of the invention is to provide an expansion coupling for screw or other rotary conveyers, which will permit the expansion of the central shaft or tube of the screw conveyer when handling hot or heavy materials; also to improve expansion couplings for screw conveyers in other respects hereinafter specified and claimed.

Reference is to be had to accompanying drawings forming a part of this application, in which Fig. 1 is a fragmentary, sectional elevation through the screw conveyer.

Figure 1:
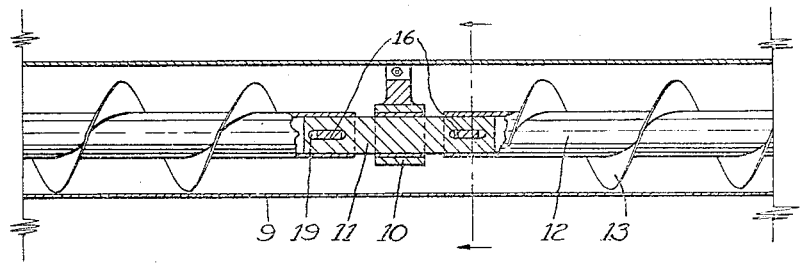
Figure 2:
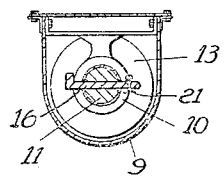
Fig. 2 is a transverse section view through the expansion coupling of the screw conveyer.
Figure 3:
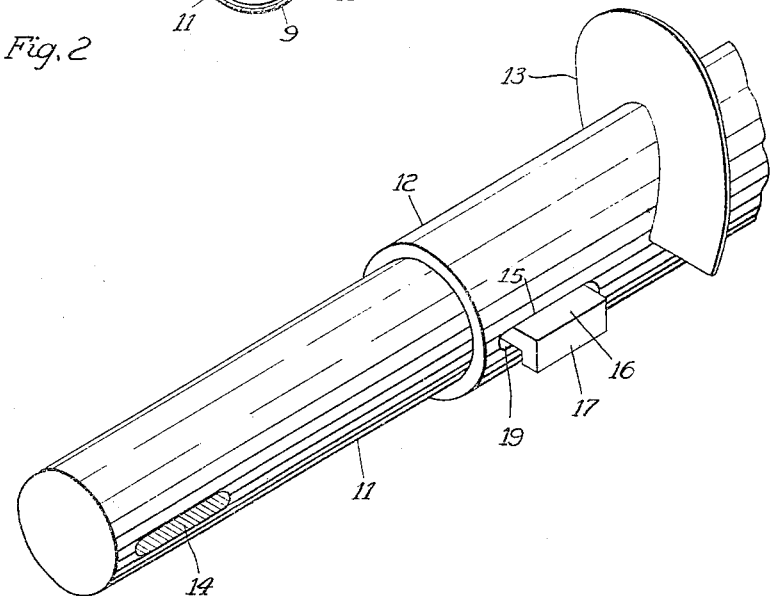
Fig. 3 is a perspective view of the expansion coupling.
Figure 4:
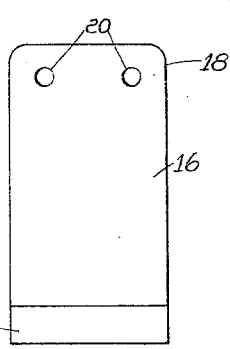
Fig. 4 is a plan view of the locking key.

In the manufacture of gypsum products such as stucco, plaster and other compositions, it is necessary to handle the material at a high temperature by means of screw conveyers. When the hot material enters the screw conveyer housing 9, it heats up the screw conveyer, and elongates it because of the thermal expansion of the steel. At the intermediate bearing support 10 of the screw conveyer which is usually secured near the top of the housing 9, where one flight of the conveyer is joined to a second flight, it has been customary to provide an elongated bar 11, which passes through and is rotatably mounted in the bearing support 10. The central shafts or tubes 12, upon which the screw conveyers 13 are formed, are then slipped over or telescoped over ends of the bar 11 and secured thereto, according to past practice, by gudgeon bolts passing diametrically through the bar 11 and tubes 12.

In operating such a conveyer with hot material, it was found that the screw conveyer would be elongated due to the hot material, and would buckle or become out of line intermediate its ends. If the hole through which the gudgeon bolt passed was made large enough to permit relative expansion between the tubes 12 and the bar 11, the play permitted around the bolt, causes the bolt to soon wear out and shear off, thus necessitating a shutdown of the conveyer, and possibly a shutdown of the entire mill until the conveyer could be repaired. Thus, with the old construction of screw conveyer couplings, a high maintenance cost was experienced and shutdowns of the mill were frequent.

With my improved construction, slots 14 are formed one at each end of bar 11, and similar slots 15 are formed in the tube 12 so as to register with the slots 14. I now provide a key 16 which is L shaped, due to a transversely extending shoulder 17 formed on one end. This key 16 is formed from a flat strip of metal, and the end opposite the shoulder 17 is provided with bevels 18, which aid in passing the key through the slots 14 and 15. The thickness of this key 16 is only slightly less than the width of slots 14 and 15, so that very little play occurs circumferentially between the tube 12 and bar 11. However, I make the width of the key 16 substantially less than the length of the slots 14 and 15, so that a clearance space 19 is provided between the ends of the slots 14 and 15 and the end of the key 16. Thus, when the screw conveyer tube 12 increases in length due to the thermal expansion from the hot material, this expansion is freely permitted by the telescoping of the bar 11 in the tube 12. The end of the key opposite the shoulder 17 is provided with one or more holes 20 through which pass cotter pins 21, so that the longitudinal movement of the key in the slots 14 and 15 is limited at one side by the shoulder 17 and at the other side by the cotter pins 21.

I have found that, with my improved expansion coupling for screw conveyers, where considerable longitudinal expansion is permitted and substantially all circumferential play is eliminated, that the keys form a connection between the screw conveyer tube 12 and the bar 11 which do not wear out, and greatly prolong the life of the screw conveyer, thus largely eliminating shutdowns of the mill due to necessary repairs on the screw conveyer.

I would state in conclusion that while the illustrated example constitutes a practical embodiment of my invention, I do not limit myself precisely to the details herein disclosed, since manifestly the same can be considerably varied without departing from the spirit of the invention, as defined in the appended claims.

Having thus described my invention, I claim as new, and desire to secure by Letters Patent:—

1. In an expansion bearing for screw conveyers, a bearing support, an elongated bar rotatably supported by said bearing support, a screw conveyer tube telescoping over each end of said bar, said tube and bar being provided with registering slots passing diametrically therethrough, a flattened key passing through each of said slots, each key having a width considerably less than the length of the slots, but having a thickness substantially equal to that of the slots so as to permit axial but not substantial circumferential movement of said tube relative to said bar, and a laterally extending member associated with each end of said key adapted to prevent the accidental removal of said key from said slot.

2. In an expansion coupling for rotary conveyers, the combination with an elongated annular member carrying a conveyer member, of a second annular member telescopically associated with said first annular member, both of said annular members having a registering slot passing substantially diametrically therethrough, a flattened bar extending through said slot to interconnect said annular members, said bar having a width substantially less than the length of said slot and a thickness substantially equal to that of the slot, so as to permit axial and prevent circumferential movement of one annular member relative to the other annular member, and means for preventing accidental removal of said bar from said slot.

3. In an expansion coupling for rotary conveyers, a pair of annular members in spaced, coaxial relation, and supporting screw conveyer flights, a connecting bearing member telescopically associated with said annular members, said annular and connecting members being provided with registering slots extending substantially diametrically therethrough to interconnect said members, flat bars extending through said slots having a width less than the length of said slots so as to permit axial contraction and expansion of said members under the action of heated materials carried by said conveyer flights, and means for preventing accidental displacement of said bars from said slots.

JOHN N. PARKER.